United States Patent
Wolff et al.

(10) Patent No.: US 10,760,451 B2
(45) Date of Patent: Sep. 1, 2020

(54) MANUFACTURE AND INSTALLATION OF DIFFUSER FLOW MIXING LOBES

(71) Applicant: General Electric Company, Schenectady, NY (US)

(72) Inventors: Damian Wolff, Ostrow Wielkopolski (PL); Karol Filip Leszczynski, Henrykow Uroczw (PL); Ajay Gangadhar Patil, Greer, SC (US); Michael Todd Summers, Simpsonville, SC (US); Brad Wilson Vantassel, Greenville, SC (US)

(73) Assignee: General Electric Company, Schenectady, NY (US)

( * ) Notice: Subject to any disclaimer, the term of this patent is extended or adjusted under 35 U.S.C. 154(b) by 244 days.

(21) Appl. No.: 15/564,809

(22) PCT Filed: May 22, 2015

(86) PCT No.: PCT/PL2015/050017
§ 371 (c)(1),
(2) Date: Oct. 6, 2017

(87) PCT Pub. No.: WO2016/190760
PCT Pub. Date: Dec. 1, 2016

(65) Prior Publication Data
US 2018/0112560 A1  Apr. 26, 2018

(51) Int. Cl.
*F01D 25/30* (2006.01)
*F01D 9/02* (2006.01)
*F02C 3/04* (2006.01)

(52) U.S. Cl.
CPC ............... *F01D 25/30* (2013.01); *F01D 9/02* (2013.01); *F02C 3/04* (2013.01); *F05D 2230/20* (2013.01); *F05D 2240/127* (2013.01)

(58) Field of Classification Search
None
See application file for complete search history.

(56) References Cited

U.S. PATENT DOCUMENTS 2,711,072 A * 6/1955 Wetzler ............. F23R 3/50
60/39.37
3,557,830 A * 1/1971 Raw .................. F02K 1/386
137/896

(Continued)

FOREIGN PATENT DOCUMENTS

EP  2484898 A1  8/2012
JP  S5453339 A  4/1979

(Continued)

OTHER PUBLICATIONS

International Search Report and Written Opinion issued in connection with corresponding PCT application PCT/PL2015/050017 dated Jan. 20, 2016.

(Continued)

*Primary Examiner* — Igor Kershteyn
*Assistant Examiner* — Juan G Flores
(74) *Attorney, Agent, or Firm* — Dority & Manning, P.A.

(57) ABSTRACT

A flow mixing lobe for an exhaust diffuser includes a first flange member having a first leading end, a first trailing end, and an intermediate portion extending therebetween. A second flange member includes a second leading end, a second trailing end, and an intermediate section extending therebetween. A first leg portion includes a first end extending from the first flange member, and a second end. A second leg portion has a first end portion extending from the second flange member, and a second end portion. A wing member is arranged between the first and second leg portions at respective ones of the second end and second end portions. The wing member includes a flow conditioning surface (Continued)

having a non-linear profile extending between the second end and the second end portion.

19 Claims, 4 Drawing Sheets

(56) References Cited

U.S. PATENT DOCUMENTS

| | | | |
|---|---|---|---|
| 3,940,097 A | | 2/1976 | Wilson et al. |
| 4,174,083 A | * | 11/1979 | Mohn ................ B64D 33/02 |
| | | | 137/15.1 |
| 8,544,799 B2 | * | 10/2013 | Da Silva ............... B64C 23/06 |
| | | | 244/130 |
| 8,863,528 B2 | * | 10/2014 | Shi ........................ F23R 3/007 |
| | | | 60/753 |
| 2010/0226767 A1 | | 9/2010 | Becker et al. |
| 2015/0075176 A1 | | 3/2015 | Ruthemeyer et al. |

FOREIGN PATENT DOCUMENTS

| | | | |
|---|---|---|---|
| JP | S57161217 A | | 10/1982 |
| JP | S61113379 A | | 5/1986 |
| JP | H08260905 A | | 10/1996 |
| JP | 2001/334962 A | | 12/2001 |
| JP | 2001334962 | * | 12/2001 |
| JP | 2006/097981 A | | 4/2006 |
| JP | 2006097981 | * | 4/2006 |

OTHER PUBLICATIONS

Machine Translated Japanese Office Action Corresponding to Application No. 2017558635 dated Mar. 19, 2019.

* cited by examiner

MANUFACTURE AND INSTALLATION OF DIFFUSER FLOW MIXING LOBES

BACKGROUND OF THE DISCLOSURE

The subject matter disclosed herein relates to turbomachines and, more particularly, to a method of manufacturing and installing turbomachine diffuser flow mixing lobes.

Gas turbomachines typically include a compressor portion, a turbine portion, and a combustor assembly. The combustor assembly mixes fluid from the compressor portion with a fuel to form a combustible mixture. The combustible mixture is combusted forming hot gases that pass along a hot gas path of the turbine portion. The turbine portion includes a number of stages having airfoils mounted to rotors that convert thermal energy from the hot gases into mechanical, rotational energy. Additional fluid from the compressor is passed through the airfoils and other sections of the turbine portion for cooling purposes. Hot gases pass, as exhaust gases, from the turbine portion into an exhaust diffuser. The exhaust diffuser is geometrically configured to rapidly decrease the kinetic energy of flow and increase static pressure recovery within the exhaust diffuser. The exhaust diffuser typically includes one or more stationary struts for mechanical support. The exhaust gases may pass from the exhaust diffuser to a downstream component.

BRIEF DESCRIPTION OF THE DISCLOSURE

According to one aspect of an exemplary embodiment, a flow mixing lobe for an exhaust diffuser includes a first flange member having a first leading end, a first trailing end, and an intermediate portion extending therebetween. The first flange member is configured to be mechanically linked to an inner surface of the exhaust diffuser. A second flange member includes a second leading end, a second trailing end, and an intermediate section extending therebetween. The second flange member is configured to be mechanically linked to the inner surface of the exhaust diffuser. A first leg portion includes a first end extending from the first flange member, a second end, a leading edge extending between the first and second ends, and a trailing edge extending between the first and second ends spaced from the leading edge. A second leg portion has a first end portion extending from the second flange member, a second end portion, a leading edge portion extending between the first and second end portions, and a trailing edge portion extending between the first and second end portions spaced from the leading edge portion. A wing member is arranged between the first and second leg portion at respective ones of the second end and second end portions. The wing member includes a flow conditioning surface having a non-linear profile extending between the second end and the second end portion.

According to another aspect of an exemplary embodiment, a turbomachine includes a compressor portion, and a turbine portion operatively connected to the compressor portion. The turbine portion includes a turbine outlet. A combustor assembly includes at least one combustor fluidically connecting the compressor portion and the turbine portion. An exhaust diffuser is fluidically connected to the turbine outlet. The exhaust diffuser includes an inner surface. A plurality of flow mixing lobes is arranged in a circumferential array on the inner surface of the diffuser. Each of the plurality of flow mixing lobes includes a first flange member having a first leading end, a first trailing end, and an intermediate portion extending therebetween. The first flange member is configured to be mechanically linked to the inner surface of the exhaust diffuser. A second flange member includes a second leading end, a second trailing end, and an intermediate section extending therebetween. The second flange member is configured to be mechanically linked to the inner surface of the exhaust diffuser. A first leg portion has a first end extending from the first flange member, a second end, a leading edge extending between the first and second ends, and a trailing edge extending between the first and second ends spaced from the leading edge. A second leg portion has a first end portion extending from the second flange member, a second end portion, a leading edge portion extending between the first and second end portions, and a trailing edge portion extending between the first and second end portions spaced from the leading edge portion. A wing member is arranged between the first and second leg portions at respective ones of the second end and second end portion. The wing member includes a flow conditioning surface having a non-linear profile extending between the second end and the second end portion.

According to yet another aspect of an exemplary embodiment, a method of forming a flow mixing lobe includes forming a first flange member, forming a second flange member, creating a first leg portion extending from the first flange member, creating a second leg portion extending from the second flange member, and establishing a wing member between the first and second leg portions, the wing member including a flow conditioning surface having a non-linear profile extending between the first and second leg portions.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Figure 1:
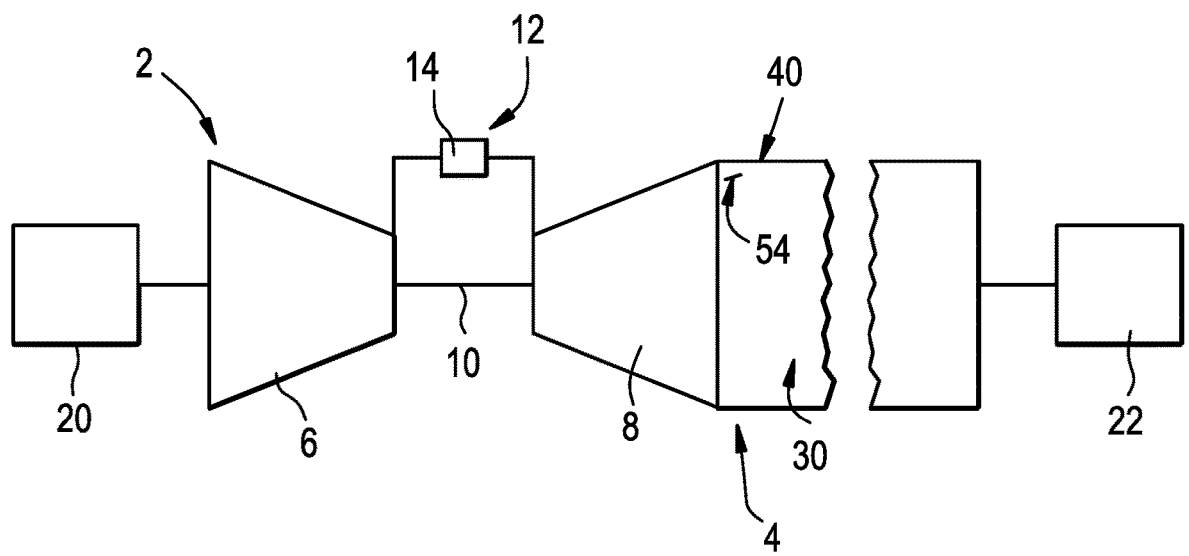
FIG. 1 depicts a schematic view of a turbomachine system including an exhaust diffuser having flow mixing lobes, in accordance with an exemplary embodiment.

A turbomachine system, in accordance with an exemplary embodiment, is indicated generally at 2, in FIG. 1. Turbomachine system 2 includes a turbomachine 4 having a compressor portion 6 operatively connected to a turbine portion 8 through a common compressor/turbine shaft 10. A combustor assembly 12 is fluidically connected between compressor portion 6 and turbine portion 8. Combustor assembly 12 includes at least one combustor 14 that directs products of combustion along a hot gas path (also not separately labeled) of turbine portion 8. An intake system 20 is fluidically connected to an inlet (not separately labeled) of compressor portion 6. A load 22 is mechanically linked to turbomachine 4.

In operation, air is passed through intake system 20 into compressor portion 6. Intake system 20 may condition the air by, for example, lowering humidity, altering temperature, and the like. The air is compressed through multiple stages of compressor portion 6 and passed to turbine portion 8 and combustor assembly 12. The air is mixed with fuel, diluents, and the like, in combustor 14 to form a combustible mixture. The combustible mixture is passed from combustor 14 into turbine portion 8 via a transition piece (not shown) as hot gases. The hot gases flow along the hot gas path of turbine portion 8 and pass as exhaust into an exhaust diffuser 30. Exhaust diffuser 30 is geometrically configured to rapidly decrease kinetic energy of exhaust gases as well as increase static pressure recovery prior to delivery to a downstream device (not shown). The downstream device may direct the exhaust gases to ambient, or extract additional energy that may be used for other purposes.

Figure 2:
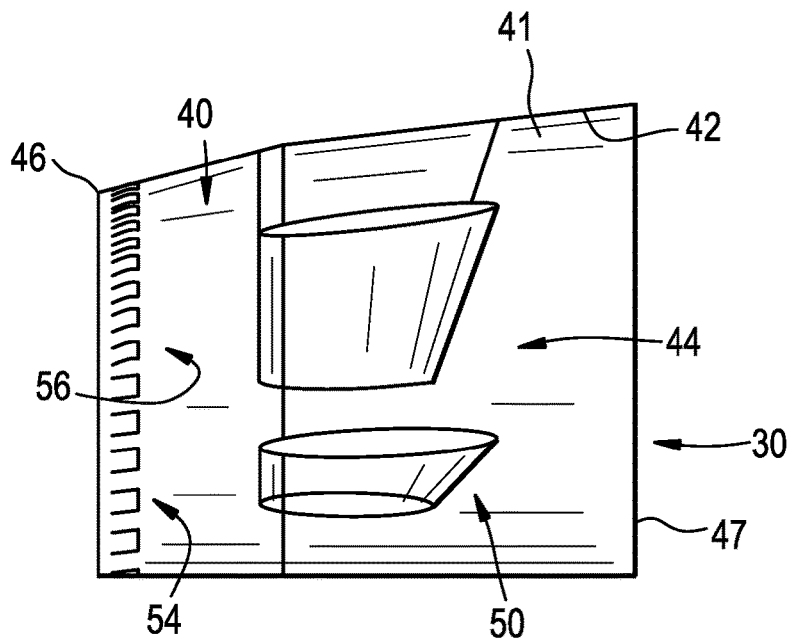
FIG. 2 depicts a partial cross-sectional side view of the diffuser of FIG. 1.
Figure 3:
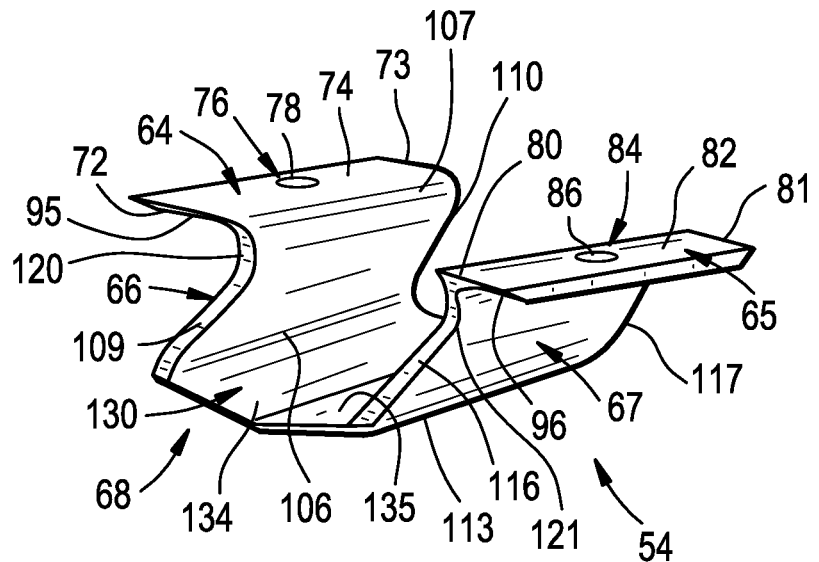
FIG. 3 depicts a perspective view of a flow mixing lobe, in accordance with an exemplary embodiment.
Figure 4:
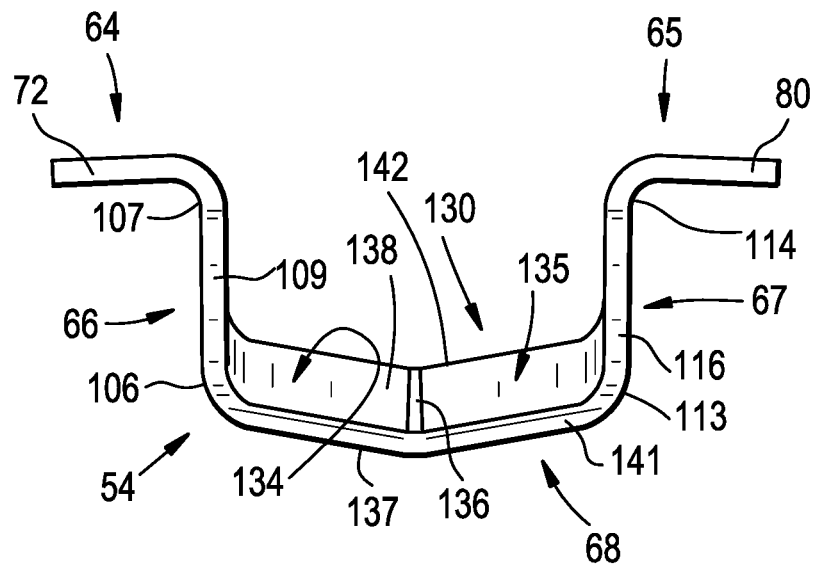
FIG. 4 depicts an upstream plan view of the flow mixing lobe of FIG. 3.

As shown in FIG. 2, exhaust diffuser 30 includes a body 40 having an outer surface 41 and an inner surface 42 that defines a diffuser flow path 44. Exhaust diffuser 30 includes an inlet 46 fluidically coupled to an outlet (not separately labeled) of turbine portion 8 and an outlet 47. Exhaust diffuser 30 is also shown to include a plurality of stationary struts, one of which is indicated at 50, extending radially inwardly to diffuser flow path 44 from inner surface 42. Stationary struts 50 condition exhaust gases flowing along diffuser flow path 44 toward outlet 47.

In accordance with an exemplary embodiment, exhaust diffuser 30 includes a plurality of flow mixing lobes, one of which is indicated at 54. Flow mixing lobes 54 are arranged in a circumferential array 56 on inner surface 42. In the exemplary embodiment shown, circumferential array 56 is arranged between inlet 46 and stationary struts 50. However, it should be understood that circumferential array 56 may be arranged downstream of inlet 46 and/or downstream of stationary struts 50. Further, it should be understood that the number and axial position of circumferential arrays 56 could vary. Additionally, it should be understood that while shown on an outer barrel (not separately labeled) of diffuser 30, flow mixing lobes 54 could also be arranged on an inner barrel (also not separately labeled) of diffuser 30.

As will be detailed more fully below, flow mixing lobes 54 are designed to withstand a high momentum flow from turbine portion 8 while, at the same time, avoiding response frequencies similar to a vortex shedding frequency in exhaust diffuser 30. Further, flow mixing lobes 54 are designed to guide a portion of the exhaust gases radially outwardly toward inner surface 42. More specifically, flow mixing lobes 54 direct the portion of the substantially high momentum flow radially outwardly toward inner surface 42 thereby generating flow vortices. The flow vortices reduce boundary layer growth at inner surface 42 resulting in a reduction in flow separation. The exemplary embodiments thus improve pressure recovery in exhaust diffuser 30 that leads to an enhancement in overall system efficiency.

Referring now to FIGS. 3-6, each flow mixing lobe 54 includes a first flange member 64, a second flange member 65, a first leg portion 66, a second leg portion 67, and a wing member 68. First and second flange members 64 and 65 act as an interface between flow mixing lobe 54 and inner surface 42 of exhaust diffuser 30. First flange member 64 includes a first leading end 72, a first trailing end 73, and an intermediate portion 74. Intermediate portion 74 includes at least one mounting component 76 shown in the form of an opening 78. Similarly, second flange member 65 includes a second leading end 80, a second trailing end 81, and an intermediate section 82. Intermediate section 82 includes at least one mounting component 84 shown in the form of an opening 86.

Figure 5:
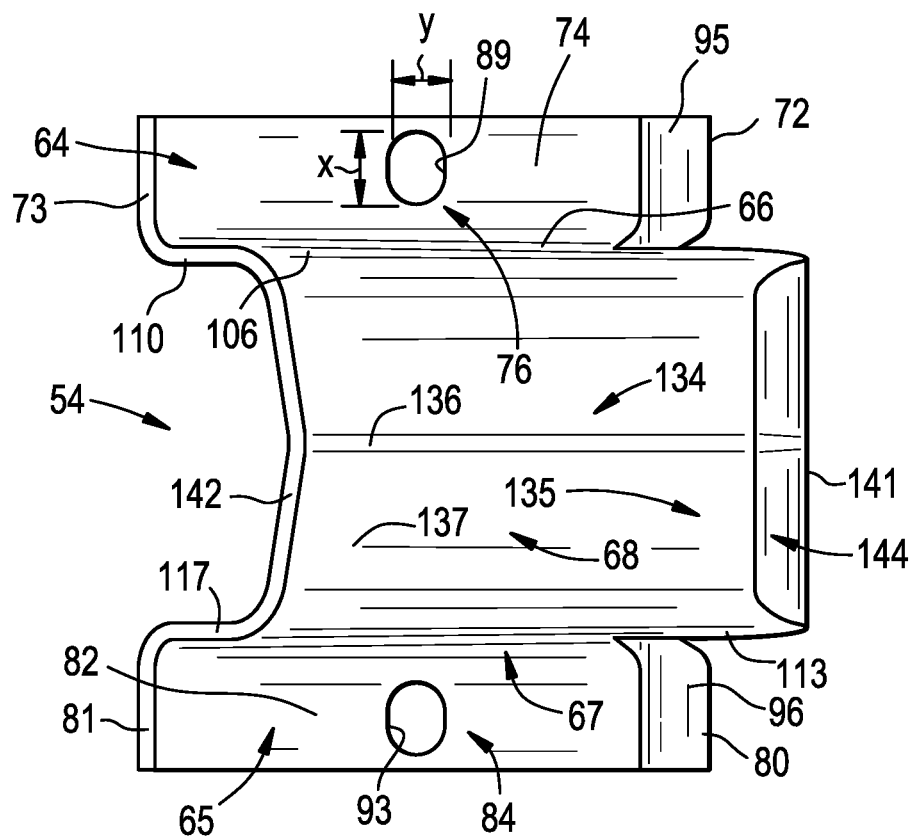
FIG. 5 depicts a bottom view of a flow mixing lobe, in accordance with an aspect of an exemplary embodiment.

At this point it should be understood that while openings 78 and 86 are shown as being circular, oblong or ovular openings, such as shown at 89 and 93 in FIG. 5, wherein like reference numbers represent corresponding parts in the respective views, may also be employed. As shown, opening 89 may include a major diameter "x" and a minor diameter "y" that is distinct from major diameter "x". Minor diameter "y" may extend between first leading end 72 and first trailing end 73 to facilitate circumferential adjustability for flow mixing lobe 54. Opening 93 may be similarly formed. In addition, each of first leading end 72 and second leading end 80 may include a corresponding chamfer 95 and 96. Chamfers 95 and 96 reduce drag on first and second flange members 64 and 65 thereby improving flow dynamics.

In further accordance with an exemplary embodiment, first leg portion 66 includes a first end 106 extending from first flange member 64, and a second end 107. First leg portion 66 also includes a leading edge 109 and a trailing edge 110. Similarly, second leg portion 67 includes a first end portion 113 that extends from second flange member 65, and a second end portion 114. Second leg portion 67 also includes a leading edge portion 116 and a trailing edge portion 117. First leg portion 66 includes a first radius portion 120 at first end 106. Second leg portion 67 includes a second radius portion 121 at first end portion 113. First and second radius portions 120 and 121 may be selectively sized to enhance frequency response characteristics of flow mixing lobe 54. Further, leading edge 109 and leading edge portion 116 may include a chamfer (not separately labeled) to reduce drag and further improve aerodynamic properties of flow mixing lobe 54.

In still further accordance with an exemplary embodiment, wing member 68 includes a flow conditioning surface 130 that guides a portion of exhaust gases passing from turbine portion 8 radially outwardly toward inner surface 42. Flow conditioning surface 130 includes a non-linear profile extending between first leg portion 66 and second leg portion 67. In accordance with an aspect of an exemplary embodiment, wing member 68 includes a first section 134 that extends from first leg portion 66 at a first angle, and a second section 135 that extends from second leg portion 67 at a second angle. First and second angles may be similar and/or distinct from one another depending upon desired mechanical and frequency responses of flow mixing lobe 54. First and second sections 134 and 135 meet at an angled portion 136. Wing member 68 is also shown to include an outer surface 137, an inner surface 138, a leading edge section 141, and a trailing edge section 142. Leading edge section 141 may include a chamfer 144 that reduces drag and still further improves aerodynamic properties of flow mixing lobe 54.

Figure 6:
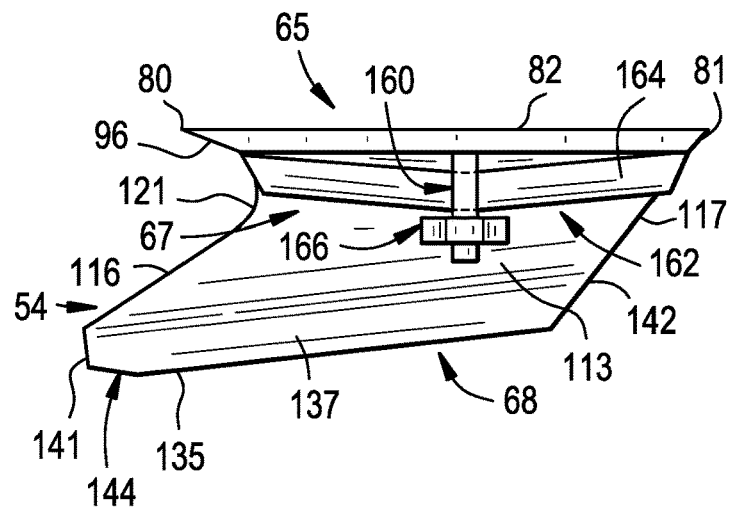
FIG. 6 depicts a side view of the flow mixing lobe of FIG. 3 shown mounted to an inner surface of the diffuser.

As shown in FIG. 6, flow mixing lobe 54 is mechanically linked to inner surface 42 of exhaust diffuser 30. More specifically, a plurality of threaded fasteners or studs, one of which is shown at 160, extends from inner surface 42. Openings 78 and 86 are receptive of corresponding ones of fasteners 160. A washer 162 is placed over fastener 160 against second flange member 65. Washer 162 may take the form of an elongated spring washer 164 that extends between second leading end 80 and second trailing end 81. A nut 166 threadably engages fastener 160 and is tightened against washer 162 securing second flange member 65 to inner surface 42. Of course, it should be understood that first flange member 64 may be secured to inner surface 42 in a similar manner. It should also be understood that flow mixing lobe 54 may be secured to inner surface 42 through a variety of other means including mechanical bonds such as through a threaded bolt, dovetail connections, hooked connections, riveted connections, t-bolt connections and the like, a fusion bond such as through welding, and/or a chemical bond or through a variety of other component-to-component joining techniques.

Figure 7:
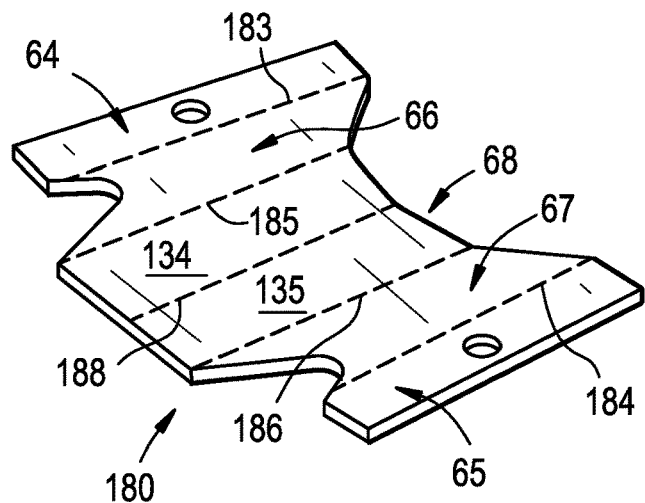
FIG. 7 depicts a flow mixing lobe blank, in accordance with an aspect of an exemplary embodiment.

Reference will now follow to FIG. 7 in describing an exemplary method of forming flow mixing lobe 54. A flow mixing lobe blank 180 is formed having a shape of a desired flow mixing lobe 54. A first bend 183 is formed creating first flange member 64. A second bend 184 is formed creating second flange member 65. Third and fourth bends 185 and 186 are formed to establish first and second leg portions 66 and 67. A fifth bend 188 may be formed to create angled portion 136. Bends 183-186 and 188 may be formed one at a time such as with a bending brake. Alternatively, bends 183-186 and 188 may be formed through one or more stamping actions of a stamping press. It should also be understood that flow mixing lobe 54 may be formed by joining one or more discrete components. For example, flow mixing lobe 54 could be formed by welding first and second flange members 64 and 65 to corresponding ones of first and second leg portions 66 and 67. Wing member 68 could also then be welded to first and second leg portions 66 and 67.

Figure 8:
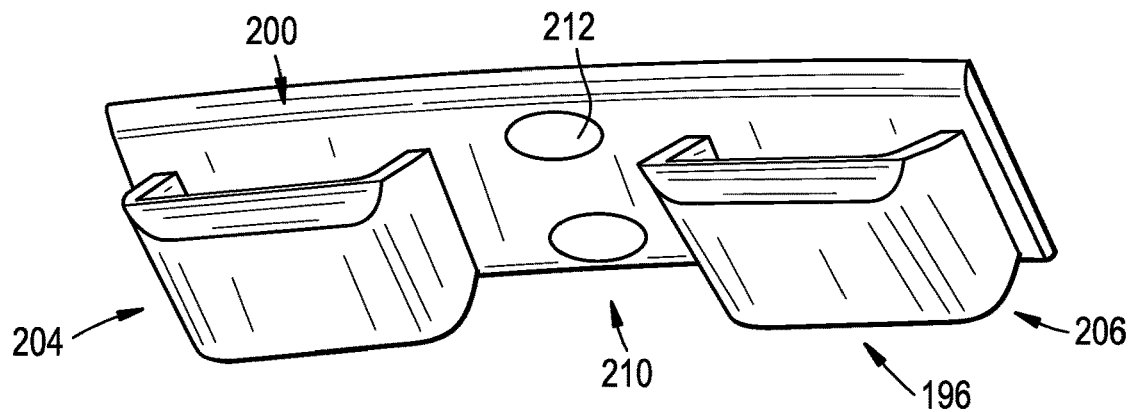
FIG. 8 depicts flow mixing lobes mounted to a support plate that may be secured to an inner surface of the exhaust diffuser.

At this point, it should be further understood that in lieu of attaching single flow mixing lobes 54 to inner surface 42, a flow mixing lobe assembly, such as shown at 196 in FIG. 8, could be mounted instead. Flow mixing lobe assembly 196 includes a base plate 200 that supports a first flow mixing lobe 204 and a second flow mixing lobe 206. Of course, the number of flow mixing lobes could vary. Base plate 200 includes a pair of openings 210 and 212 that may be receptive of threaded fasteners extending from inner surface 42.

In accordance with an exemplary embodiment, flow mixing lobes 54 are designed to withstand various stresses within exhaust diffuser 30. For example, flow mixing lobes 54 possess a desired stiffness that reduces a vortex shedding frequency response while also possessing a desired flexibility to withstand hoop stresses. Further, flow mixing lobes 54 are designed to avoid contact with rotating components of turbine portion 8 in the event of a failure of one or another of the threaded fasteners 160. More specifically, a maximum distance from either one of openings 78 and 86, and any other portion of flow mixing lobe 54, is less than a distance to any rotating component in turbine portion 8. Further, leading edge section 141 of wing member 68 extends axially forwardly of first and second leading ends 72 and 80 of corresponding ones of first and second flange members 64 and 65, and trailing edge section 142 extends axially forwardly of first and second tailing ends 73 and 81 of corresponding ones of first and second flange member 64 and 65. The distance leading edge section 141 extends axially forwardly of first and second leading ends 72 and 80 may vary and could be adjusted to further affect various mechanical properties of flow mixing lobe 54. In addition, first and second leading ends 72 and 80 are arranged axially forwardly of leading edge 109 and leading edge portion 116. The distance first and second leading ends 72 and 80 extend axially forwardly of leading edge 109 and leading edge portion 116 may also be varied to adjust mechanical properties of flow mixing lobe 54.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A flow mixing lobe for an exhaust diffuser comprising:
a first flange member including a first leading end, a first trailing end, and an intermediate portion extending therebetween, the first flange member being configured to be mechanically linked to an inner surface of the exhaust diffuser;
a second flange member including a second leading end, a second trailing end, and an intermediate section extending therebetween, the second flange member being configured to be mechanically linked to the inner surface of the exhaust diffuser;
a first leg portion having a first end extending from the first flange member, a second end, a leading edge extending between the first and second ends, and a trailing edge extending between the first and second ends spaced from the leading edge, wherein the leading edge of the first leg portion includes a first radius portion at the first end;
a second leg portion having a first end portion extending from the second flange member, a second end portion, a leading edge portion extending between the first and second end portions, and a trailing edge portion extending between the first and second end portions spaced from the leading edge portion, wherein the leading edge portion of the second leg portion includes a second radius portion at the first end portion; and
a wing member arranged between the first and second leg portions at respective ones of the second end and the second end portion, the wing member including a flow conditioning surface having a non-linear profile extending between the second end and the second end portion.

2. The flow mixing lobe according to claim 1, wherein the flow conditioning surface includes a first section extending from the first leg portion at a first angle and a second section extending from the second leg portion at a second angle, the first and second sections being connected at an angled portion.

3. The flow mixing lobe according to claim 1, wherein the wing member includes a leading edge section and a trailing edge section, the leading edge section extending outwardly of the first and second leading ends of corresponding ones of the first and second flange members.

4. The flow mixing lobe according to claim 3, wherein the wing member includes an outer surface and an inner surface, the outer surface including a chamfer at the leading edge section.

5. The flow mixing lobe according to claim 1, wherein each of the first and second flange members includes an opening extending through corresponding ones of the intermediate portion and the intermediate section, each opening being receptive of a threaded fastener extending from the inner surface of the exhaust diffuser.

6. The flow mixing lobe according to claim 5, wherein each opening includes a major diameter and a minor diameter that is distinct from the major diameter, the minor diameter of each opening extending between corresponding ones of the first leading end and the first trailing end, and the second leading end and the second trailing end.

7. The flow mixing lobe according to claim 1, wherein each of the first and second flange members, first and second leg portions and wing member are integrally formed.

8. A turbomachine comprising:
a compressor portion;
a turbine portion operatively connected to the compressor portion, the turbine portion including a turbine outlet;
a combustor assembly including at least one combustor that fluidically connects the compressor portion and the turbine portion;
an exhaust diffuser is fluidically connected to the turbine outlet, the exhaust diffuser including an inner surface; and
a plurality of flow mixing lobes arranged in a circumferential array on the inner surface of the exhaust diffuser, each of the plurality of flow mixing lobes comprising:
a first flange member including a first leading end, a first trailing end, and an intermediate portion extending therebetween, the first flange member being mechanically linked to the inner surface of the exhaust diffuser;
a second flange member including a second leading end, a second trailing end, and an intermediate section extending therebetween, the second flange member being mechanically linked to the inner surface of the exhaust diffuser;
a first leg portion having a first end extending from the first flange member, a second end, a leading edge extending between the first and second ends, and a trailing edge extending between the first and second ends spaced from the leading edge, wherein the leading edge of the first leg portion includes a first radius portion at the first end;
a second leg portion having a first end portion extending from the second flange member, a second end portion, a leading edge portion extending between the first and second end portions, and a trailing edge portion extending between the first and second end portions spaced from the leading edge portion, wherein the leading edge portion of the second leg portion includes a second radius portion at the first end portion; and
a wing member arranged between the first and second leg portions at respective ones of the second end and the second end portion, the wing member including a flow conditioning surface having a non-linear profile extending between the second end and the second end portion.

9. The turbomachine according to claim 8, wherein each of the first and second flange members includes an opening extending through the corresponding ones of the intermediate portion and intermediate section, the exhaust diffuser including a plurality of threaded fasteners extending from the inner surface, each opening being receptive of a corresponding one of the plurality of threaded fasteners.

10. The turbomachine according to claim 9, wherein each opening includes a major diameter and a minor diameter that is distinct from the major diameter, the major diameter facilitating movement of the flow mixing lobe relative to the inner surface.

11. The turbomachine according to claim 9, further comprising: at least one washer positioned about the corresponding one of the plurality of threaded fasteners passing through the each opening.

12. The turbomachine according to claim 11, further comprising: at least one nut mechanically engaged with the corresponding one of the plurality of threaded fasteners passing through each opening, the at least one nut mechanically linking the flow mixing lobe to the inner surface.

13. The turbomachine according to claim 8, wherein the flow conditioning surface includes a first section extending from the first leg portion at a first angle and a second section extending from the second leg portion at a second angle, the first and second sections being connected at an angled portion.

14. The turbomachine according to claim 8, wherein the wing member includes a leading edge section and a trailing edge section, the leading edge section extending outwardly of the first and second leading ends of corresponding ones of the first and second flange members.

15. The turbomachine according to claim 14, wherein the wing member includes an outer surface and an inner surface, the outer surface including a chamfer at the leading edge section.

16. The turbomachine according to claim 8, wherein each of the first and second flange members, first and second leg portions and wing member are integrally formed.

17. A method of forming a flow mixing lobe comprising:
forming a first flange member;
forming a second flange member;
creating a first leg portion extending from the first flange member, the first leg portion including a leading edge having a first radius portion;
creating a second leg portion extending from the second flange member, the second leg portion including a leading edge portion having a second radius portion; and
establishing a wing member between the first and second leg portions, the wing member including a flow conditioning surface having a non-linear profile extending between the first and second leg portions.

18. The method of claim 17, wherein forming the first flange member includes forming a first bend in a flow mixing lobe blank, creating the first leg portion includes creating a second bend in the flow mixing lobe blank, creating the second leg portion includes creating a third bend in the flow mixing lobe blank, and forming the second flange member includes forming a fourth bend in the flow mixing lobe blank.

19. The method of claim 18, wherein establishing the wing member includes forming a fifth bend in the flow mixing lobe blank, the fifth bend creating the non-linear profile of the flow conditioning surface.

\* \* \* \* \*